United States Patent
Fisch et al.

(10) Patent No.: US 11,390,228 B2
(45) Date of Patent: Jul. 19, 2022

(54) CIRCUIT ARRANGEMENT FOR PROVIDING A PLURALITY OF SUPPLY VOLTAGES

(71) Applicant: VITESCO TECHNOLOGIES GMBH, Hannover (DE)

(72) Inventors: Alfons Fisch, Munich (DE); Andreas Wunderlich, Munich (DE); Mikhail Zarkhin, Munich (DE); Aurore Desgeorge, Munich (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 17/254,596

(22) PCT Filed: May 29, 2019

(86) PCT No.: PCT/EP2019/064003
§ 371 (c)(1),
(2) Date: Dec. 21, 2020

(87) PCT Pub. No.: WO2019/243014
PCT Pub. Date: Dec. 26, 2019

(65) Prior Publication Data
US 2021/0129776 A1 May 6, 2021

(30) Foreign Application Priority Data
Jun. 21, 2018 (DE) .......................... 102018210097.7

(51) Int. Cl.
*B60R 16/023* (2006.01)
*H02J 1/00* (2006.01)

(52) U.S. Cl.
CPC ........ *B60R 16/0231* (2013.01); *B60R 16/023* (2013.01); *H02J 1/00* (2013.01)

(58) Field of Classification Search
None
See application file for complete search history.

(56) References Cited

U.S. PATENT DOCUMENTS

| 6,765,373 | B1 | 7/2004 | Harvey et al. |
| 7,173,347 | B2 | 2/2007 | Tani et al. |
| 2010/0287398 | A1* | 11/2010 | Froschhammer ......... G06F 1/28 713/340 |

(Continued)

FOREIGN PATENT DOCUMENTS

| DE | 10347684 A1 | 5/2004 |
| EP | 2369727 A2 | 9/2011 |
| WO | 2009040216 A2 | 4/2009 |

*Primary Examiner* — Jared Fureman
*Assistant Examiner* — Aqeel H Bukhari
(74) *Attorney, Agent, or Firm* — Laurence A. Greenberg; Werner H. Stemer; Ralph E. Locher

(57) ABSTRACT

A circuit arrangement for providing a plurality of supply voltages at output terminals respectively assigned to said supply voltages from an input voltage applied to an input terminal. A digital interface receives of a serial digital control signal that contains the information as to which of the supply voltages is/are to be applied to the output terminals respectively assigned to them. A hard-wired delay circuit is configured, under control by the serial digital control signal, to relay the supply voltages to be applied to the respectively assigned output terminals to the output terminals one after another with a respectively predetermined delay.

2 Claims, 7 Drawing Sheets

(56) References Cited

U.S. PATENT DOCUMENTS

2011/0234000 A1\* 9/2011 Yan .......................... H02J 1/08
307/31
2015/0091376 A1 4/2015 Kim et al.

\* cited by examiner

FIG 2

If Track1 falling edge then
  O_track1_en_out=0
Else if Track2 falling edge then
  O_track2_en_out=0
Else if Track3 falling edge then
  O_track3_en_out=0
Else if Track4 falling edge then
  O_track4_en_out=0
Else if Track1 rising edge then
  O_track1_en_out=1
  Wait for 1,2ms
Else if Track2 rising edge then
  O_track2_en_out=1
  Wait for 1,2ms Else if Track3 rising edge then
  O_track3_en_out=1
  Wait for 1,2ms Else if Track4 rising edge then
  O_track4_en_out=1
  Wait for 1,2ms
End

# CIRCUIT ARRANGEMENT FOR PROVIDING A PLURALITY OF SUPPLY VOLTAGES

BACKGROUND OF THE INVENTION

Field of the Invention

In many devices, particularly in the case of control units in the automotive field, use is made of circuit arrangements that generate a plurality of output voltages from a—for the most part—regulated input voltage, regulate them and provide them at output terminals. Such circuit arrangements are realized—for the most part—as integrated circuits, so-called ASICs (application-specific integrated circuits).

In the case of control units in the automotive field, a pre-regulated input voltage obtained from the battery voltage of—for the most part—12 volts to 14 volts, is, for example, used for the circuit arrangement which in this case provides voltages of, for instance, 1.3 volts, 3.3 volts and 5 volts at its output terminals. In this case, the individual voltage values may also occur several times, in order not to load individual outputs too greatly.

The output voltages in this case are capable of being switched frequently, the circuit arrangement having a digital interface, for instance an SPI, via which a control signal for switching one or more of the output voltages in or out can be transmitted to the circuit arrangement and received by the circuit arrangement.

In the case where all or a relatively large number of the supply voltages are switched in at the same time, it may happen that the voltage regulator making the input voltage available to the circuit arrangement is overloaded by the inrush current then arising and is switched off or reset.

This can be remedied, by this voltage regulator being designed to be appropriately robust, but this is elaborate and accordingly expensive.

An alternative is to switch in the supply voltages only in staggered manner via the control signal, but this is problematic.

SUMMARY OF THE INVENTION

The object of the invention is therefore to specify a circuit arrangement for providing a plurality of supply voltages that avoids these problems.

The object is achieved by a circuit arrangement as claimed. An advantageous design is specified in the dependent claim.

Accordingly, a circuit arrangement for providing a plurality of supply voltages at output terminals respectively assigned to said supply voltages is formed from an input voltage applied to an input terminal, with a digital interface for reception of a serial digital control signal that contains the information as to which of the supply voltages is/are to be applied to the output terminals respectively assigned to them, and with a hard-wired delay circuit which has been set up, controlled by the serial digital control signal, to relay the supply voltages to be applied to the respectively assigned output terminals one after another to the output terminals with a respectively predetermined delay.

In this case, immediately following upon the control signal the first supply voltage to be switched in and subsequently—in a firmly predetermined sequence, delayed in each instance by a predetermined time-interval—the other supply voltages to be switched in are relayed to the output terminals.

In a preferred version, the delay circuit is a digital circuit. This delay circuit can, for instance, be developed and realized by means of a hardware description language such as VHDL.

The invention will be described in more detail in the following with reference to embodiments with the aid of figures. Shown therein are:

BRIEF DESCRIPTION OF THE SEVERAL VIEWS OF THE DRAWING

FIG. 1 a schematic representation of a circuit arrangement according to the invention, FIG. 2 a program in VHDL for generating a digital delay circuit, FIG. 3 a status diagram of this program and FIGS. 4 to 7 timing diagrams that clarify the consecutive relaying of the supply voltages to be switched in.

DETAILED DESCRIPTION OF THE INVENTION

Figure 1:
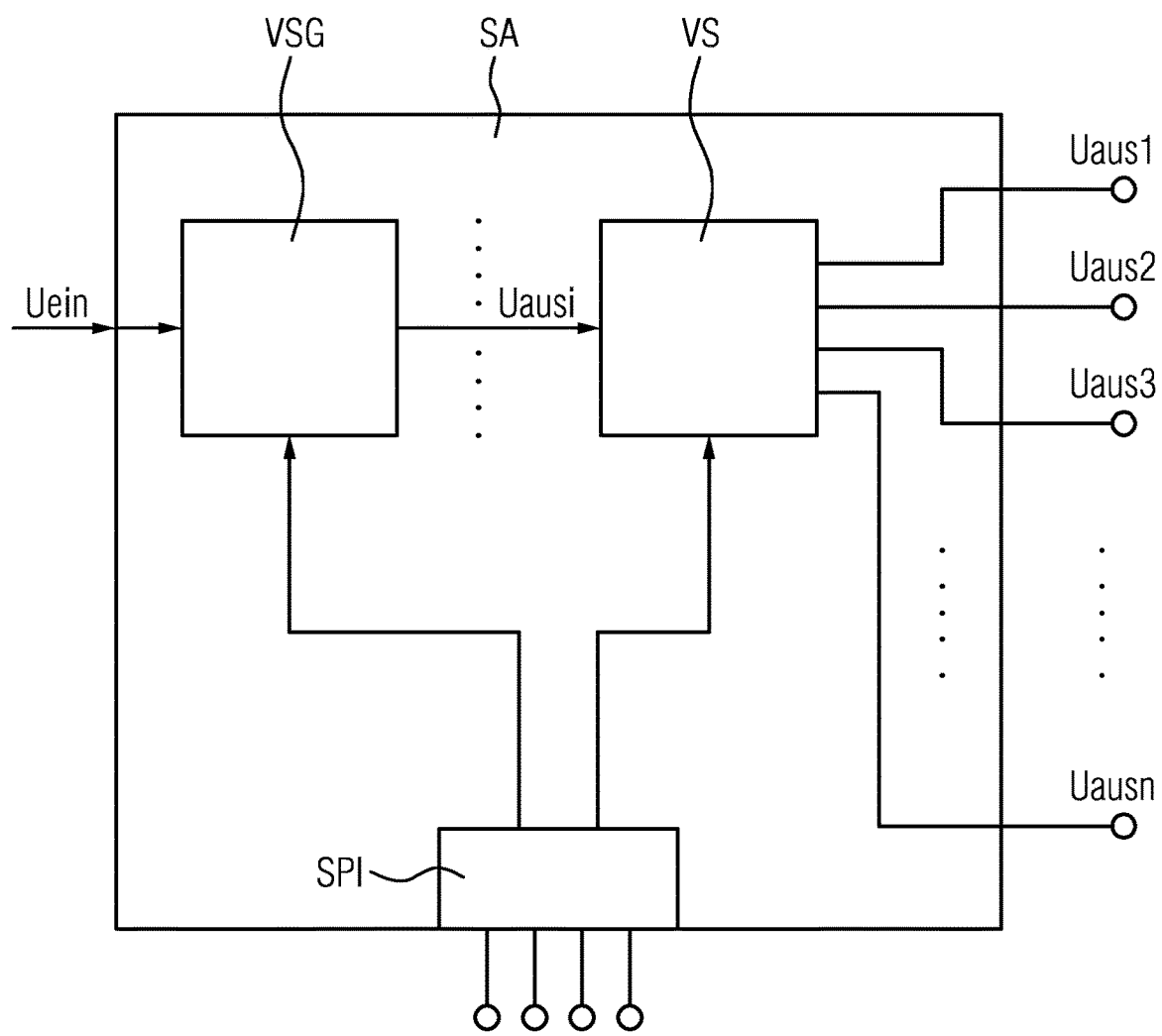

A circuit arrangement SA according to the invention is represented in schematic manner in FIG. 1. To the circuit arrangement SA an input voltage Uin is supplied, from which supply-voltage generators VSG generate a plurality of supply voltages Uouti with i=1 to n. These supply voltages are supplied to a delay circuit VS which, in turn, is connected to corresponding output terminals of the circuit arrangement SA, to which the supply voltages Uout1 to Uoutn are relayed by the delay circuit VS.

The supply voltages at the output terminals may assume different voltages, in which case the respectively different voltages may also occur several times. Accordingly, for example, several 5 volt supply voltages, several 3.3 volt supply voltages and also several 1.3 volt supply voltages can be output at the output terminals of the circuit arrangement SA.

The circuit arrangement SA furthermore has a digital interface—in the example represented, in the form of an SPI—which outwardly exhibits the conventional four terminals and may have been connected within the circuit arrangement at least to the delay circuit VS but also to other circuit components of the circuit arrangement SA, for instance to the supply-voltage generators VSG.

A command containing information as to which of the supply voltages is/are to be switched in or out is supplied to the circuit arrangement SA via the digital interface SPI. This is undertaken with a command which is supplied, directly or in already decoded form, to the delay circuit VS which now, on the one hand, switches out supply voltages to be switched out and, on the other hand, in inventive manner switches in, one after another, the supply voltages to be switched in, in each instance delayed by a predetermined time—for instance 1.2 ms.

Essential for the invention is the fact that a particular delay-time has not been assigned to a particular supply voltage, but always only the supply voltages to be switched in are switched in one after another in delayed manner.

The delay circuit VS is preferably realized in hard-wired form as a digital circuit and can in advantageous manner according to FIG. 2 be defined by means of the hardware description language VHDS, from which it is designed in known manner as a digital circuit by means of an appropriate program. FIG. 2 shows an example of such a program in the description language VHDS for four supply voltages Track1 to Track4 to be switched in. The delay in this case is to be 1.2 ms in each instance.

Figure 3:
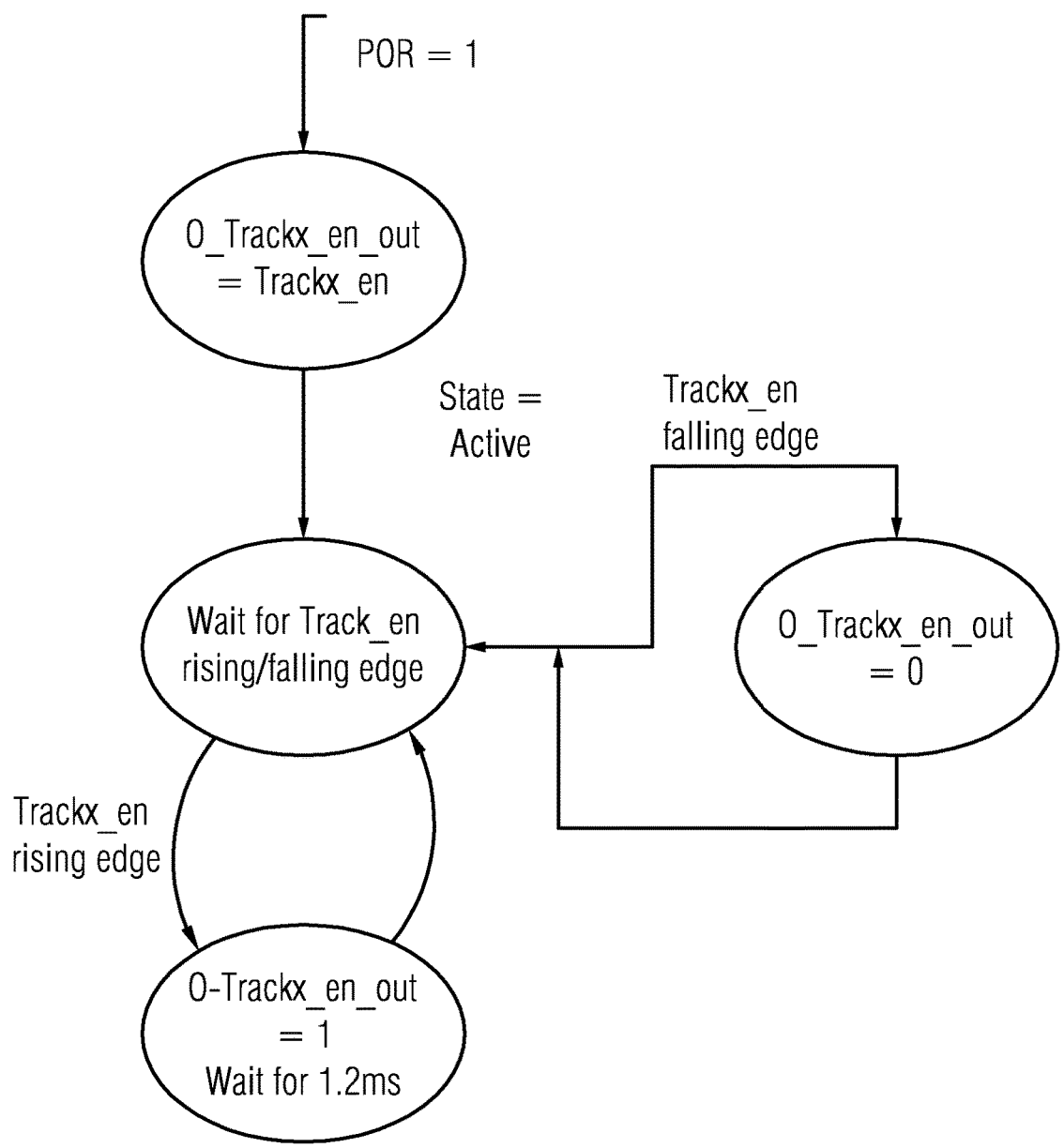

FIG. 3 shows a corresponding status diagram, as is customary for digital circuits.

In FIGS. 4 to 7 four examples are now represented, in which, triggered by the stated SPI command which in each instance is represented in the uppermost line, the supply voltages Track1 to Track4 to be respectively switched in, or a selection thereof, are switched in one after another.

Figure 4:
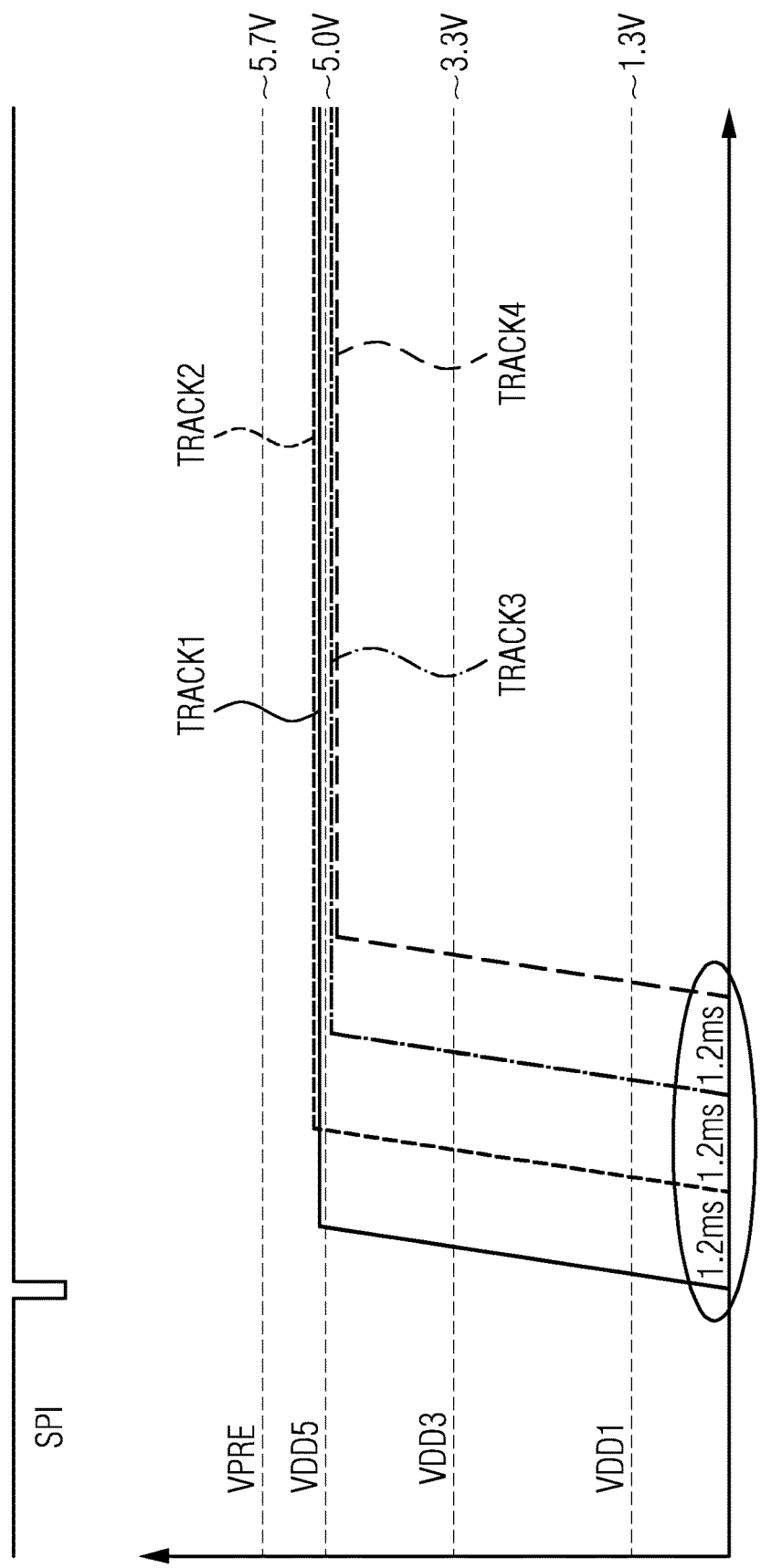

In FIG. 4 all four supply voltages Track1 to Track4 are to be switched in, in which connection it can be seen that, immediately following upon the SPI command, supply voltage Track1 is switched in, thereupon, delayed by 1.2 ms, supply voltage Track2 etc., up until the last supply voltage Track4.

Figure 5:
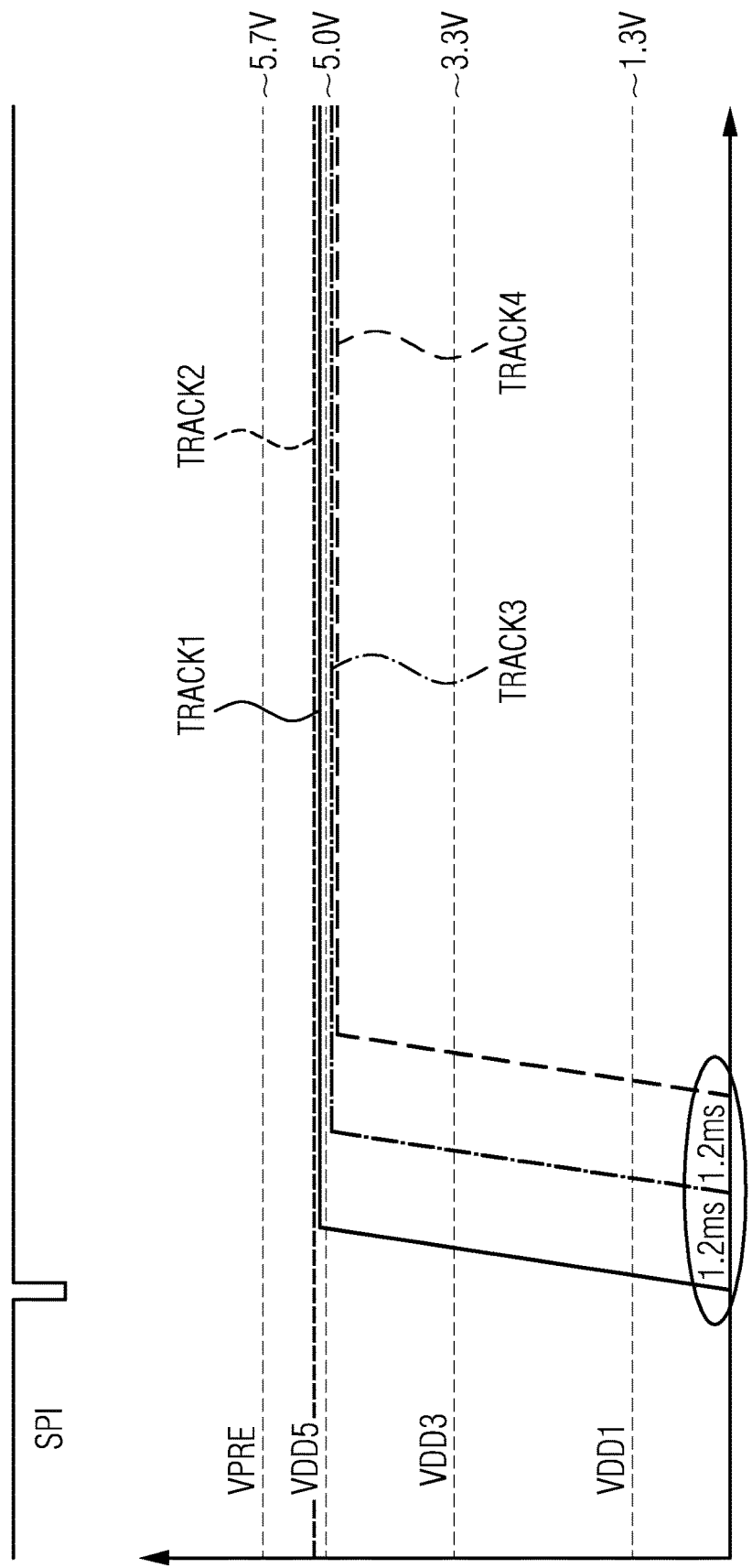

In the representation shown in FIG. 5, merely supply voltages Track1, Track2 and Track4 are to be switched in, in which connection once again, following shortly after the SPI command, the first supply voltage Track1 and then, delayed by 1.2 ms, already supply voltage Track3 and, once again delayed by 1.2 ms, supply voltage Track4 are switched in.

Figure 6:
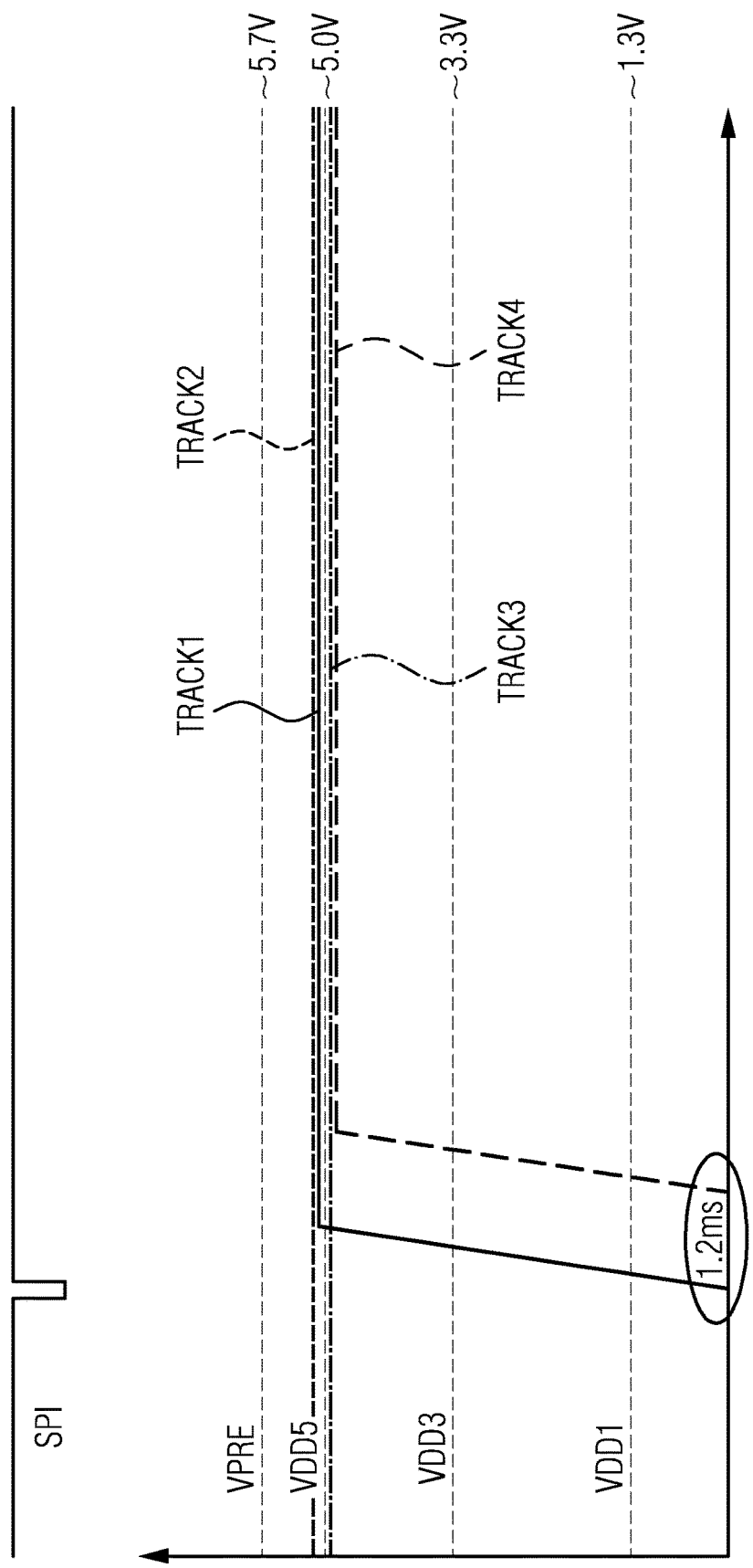

In the representation shown in FIG. 6, merely supply voltages Track3 and Track4 are to be switched in, in which connection here, following shortly after the SPI command, supply voltage Track3 is now already switched in and, after 1.2 ms delay-time, supply voltage Track4.

Figure 7:
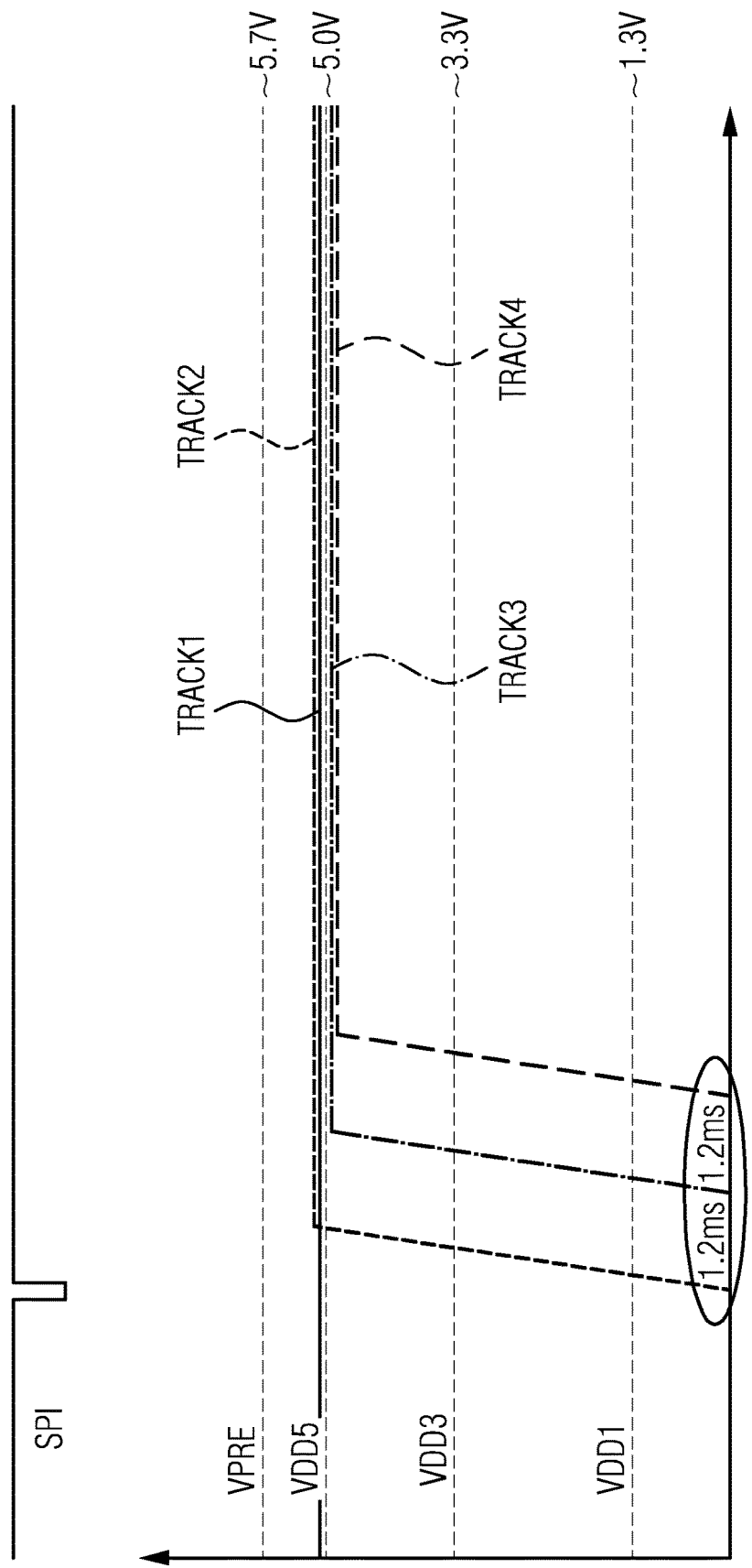

As the last example, FIG. 7 shows the case where supply voltages Track 2 to Track4 are to be switched in, in which connection here, likewise after the receiving and decoding of the SPI command, supply voltage Track2 is switched in at once and subsequently, in each instance with 1.2 ms delay, supply voltages Track3 and Track4 consecutively.

In accordance with the circuit arrangement according to the invention with a hardware realization of a delay circuit, accordingly in effective and simple manner the situation can be prevented where, as a result of simultaneous relaying of supply voltages to the outputs of a circuit arrangement for providing a plurality of supply voltages, which generates this plurality of output voltages from a—for the most part—regulated input voltage, the regulated input voltage breaks down as a result of excessive loading by reason of the inrush current, and the voltage regulator making this input voltage available is, where appropriate, switched off or reset. By virtue of the staggered switching-in of the supply voltages to be respectively switched in, this loading can be distributed, so that even a less robust voltage regulator may find application for the input voltage.

The invention claimed is:

1. A circuit arrangement, comprising:
   an input terminal for receiving an input voltage;
   a plurality of output terminals for respectively outputting supply voltages from the input voltage applied to said input terminal,
   a digital interface for receiving a serial digital control signal that contains information as to which of the supply voltages are to be applied to said output terminals respectively assigned to the supply voltages;
   a hard-wired delay circuit connected to receive the digital control signal and configured, under the control of the serial digital control signal, to relay the supply voltages to be applied to the respectively assigned output terminals to the respective said output terminals one after another with a respectively predetermined delay;
   wherein said delay circuit is configured to relay the supply voltages to only a subset of said output terminals one after another with the respectively predetermined delay based on the information in the serial digital control signal received by said digital interface.

2. The circuit arrangement according to claim 1, wherein said delay circuit is a digital circuit.

\* \* \* \* \*